US011934159B2

(12) United States Patent
Zheng

(10) Patent No.: US 11,934,159 B2
(45) Date of Patent: Mar. 19, 2024

(54) APPARATUS AND METHODS FOR NON-INVASIVE CLOSED LOOP STEP TESTING WITH CONTROLLABLE OPTIMIZATION RELAXATION

(71) Applicant: AspenTech Corporation, Bedford, MA (US)

(72) Inventor: Qingsheng Quinn Zheng, Sugar Land, TX (US)

(73) Assignee: AspenTech Corporation, Bedford, MA (US)

(*) Notice: Subject to any disclaimer, the term of this patent is extended or adjusted under 35 U.S.C. 154(b) by 0 days.

(21) Appl. No.: 16/174,641

(22) Filed: Oct. 30, 2018

(65) Prior Publication Data

US 2020/0133210 A1 Apr. 30, 2020

(51) Int. Cl.
*G05B 13/04* (2006.01)

(52) U.S. Cl.
CPC .................. *G05B 13/048* (2013.01)

(58) Field of Classification Search
CPC .. G05B 13/048; G05B 13/041; G05B 13/042; G05B 2219/42044; G05B 2219/42136;
(Continued)

(56) References Cited

U.S. PATENT DOCUMENTS 5,301,101 A 4/1994 MacArthur et al.
5,640,491 A 6/1997 Bhat et al.
(Continued)

FOREIGN PATENT DOCUMENTS

CN 106600000 A 4/2017
CN 107430398 A 12/2017
(Continued)

OTHER PUBLICATIONS

Machine Translation for JP 2004-265381 A, obtained Jun. 2022 (Year: 2022).*

(Continued)

*Primary Examiner* — Darrin D Dunn
*Assistant Examiner* — Vi N Tran
(74) *Attorney, Agent, or Firm* — Hamilton, Brook, Smith & Reynolds, P.C.

(57) ABSTRACT

A controller has improved closed-loop step testing of a dynamic process of an industrial processing plant. The controller performs economic optimization relaxation on process variables, such that operating range of the variables (MVs and CVs) during the testing are not skewed by variations in optimization cost factors. The controller employs computer-implemented methods and systems that receive a user-defined giveaway tolerance representing an allowable range between a current process variable value and a target process variable value. In response to the variables not meeting the giveaway tolerance, embodiments adjust the MPC controller configuration to drive the variables inside the tolerance, while relaxing optimization of the variables already meeting the giveaway tolerance. Using the adjusted configuration, embodiments calculate a new set of targets and generate a dynamic move plan from the new target. Embodiments add perturbation signals for the testing to the move plan in accordance with the adjusted configuration.

18 Claims, 8 Drawing Sheets

(58) Field of Classification Search
CPC ........... G05B 2219/42154; G05B 2219/42164; G05B 2219/42165
See application file for complete search history.

(56) References Cited

U.S. PATENT DOCUMENTS

| | | | |
|---|---|---|---|
| 5,682,309 A | 10/1997 | Bartusiak et al. | |
| 6,056,781 A | 5/2000 | Wassick et al. | |
| 6,088,630 A | 7/2000 | Cawlfield | |
| 6,819,964 B2 | 11/2004 | Harmse | |
| 6,937,966 B1 | 8/2005 | Hellerstein et al. | |
| 7,085,615 B2 | 8/2006 | Persson et al. | |
| 7,209,793 B2 | 4/2007 | Harmse et al. | |
| 7,213,007 B2 | 5/2007 | Gricknik | |
| 7,330,804 B2 | 2/2008 | Turner et al. | |
| 8,560,092 B2 | 10/2013 | Zheng et al. | |
| 9,141,911 B2 | 9/2015 | Zhao et al. | |
| 9,513,610 B2 | 12/2016 | Zheng | |
| 9,535,808 B2 | 1/2017 | Bates et al. | |
| 10,031,510 B2 | 7/2018 | Zhao et al. | |
| 10,114,367 B2 | 10/2018 | Bates et al. | |
| 10,131,025 B2* | 11/2018 | Kitayama | B23K 26/0853 |
| 10,627,788 B2* | 4/2020 | Ohmori | G05B 13/0265 |
| 10,739,752 B2 | 8/2020 | Zhao et al. | |
| 11,027,424 B2* | 6/2021 | Umeyama | B25J 13/085 |
| 11,782,401 B2 | 10/2023 | Keenan et al. | |
| 2002/0099724 A1* | 7/2002 | Harmse | G05B 17/02 |
| 2004/0049295 A1* | 3/2004 | Wojsznis | G05B 11/32 700/19 |
| 2004/0249481 A1 | 12/2004 | Zheng et al. | |
| 2005/0149208 A1* | 7/2005 | Harmse | G05B 17/02 700/29 |
| 2006/0111858 A1 | 5/2006 | Zhu | |
| 2007/0225835 A1 | 7/2007 | Zhu | |
| 2008/0183311 A1 | 7/2008 | MacArthur et al. | |
| 2008/0188957 A1* | 8/2008 | Cutler | G05B 11/32 700/39 |
| 2009/0005889 A1* | 1/2009 | Sayyar-Rodsari | G05B 13/048 700/44 |
| 2009/0210081 A1* | 8/2009 | Sustaeta | H04L 67/125 715/702 |
| 2010/0241247 A1* | 9/2010 | Attarwala | G05B 19/4063 700/32 |
| 2011/0130850 A1 | 6/2011 | Zheng et al. | |
| 2013/0204403 A1* | 8/2013 | Zheng | G05B 13/048 700/38 |
| 2013/0246316 A1 | 9/2013 | Zhao et al. | |
| 2013/0338842 A1 | 12/2013 | Inoue et al. | |
| 2015/0316905 A1* | 11/2015 | Zheng | G05B 17/02 700/29 |
| 2016/0048119 A1* | 2/2016 | Wojsznis | G05B 13/048 700/11 |
| 2016/0260041 A1 | 9/2016 | Horn et al. | |
| 2016/0320768 A1 | 11/2016 | Zhao et al. | |
| 2017/0308802 A1 | 10/2017 | Ramsy et al. | |
| 2018/0019910 A1 | 1/2018 | Tsagkaris et al. | |
| 2018/0157225 A1 | 6/2018 | Dave et al. | |
| 2018/0356806 A1* | 12/2018 | Dave | G05B 19/406 |
| 2019/0095816 A1 | 3/2019 | Lee et al. | |
| 2019/0179271 A1 | 6/2019 | Modi et al. | |
| 2019/0197403 A1 | 6/2019 | Schmidhuber | |
| 2019/0236447 A1* | 8/2019 | Cohen | G06N 5/02 |
| 2020/0103838 A1 | 4/2020 | Bertinetti et al. | |
| 2020/0175374 A1 | 6/2020 | Hestness et al. | |
| 2020/0242483 A1 | 7/2020 | Shashikant Rao et al. | |
| 2020/0257969 A1 | 8/2020 | Goloubew et al. | |
| 2021/0034023 A1 | 2/2021 | Keenan | |

FOREIGN PATENT DOCUMENTS

| | | | |
|---|---|---|---|
| EP | 2825920 B1 | 1/2021 | |
| GB | 2409293 A | 6/2005 | |
| JP | 06-187004 | 7/1994 | |
| JP | 2004265381 A * | 9/2004 | G05B 11/32 |
| JP | 2005-202934 | 7/2005 | |
| JP | 2009-509217 A | 3/2009 | |
| JP | 2009-516301 | 4/2009 | |
| JP | 2011-054163 A | 3/2011 | |
| JP | 2013-535730 A | 9/2013 | |
| JP | 2019-521444 A | 7/2019 | |
| WO | 2002005042 | 1/2002 | |
| WO | 2008119008 | 10/2008 | |
| WO | 2012/012723 A2 | 1/2012 | |
| WO | 2012/118067 A1 | 9/2012 | |
| WO | 2013119665 | 8/2013 | |
| WO | 2013/170041 A2 | 11/2013 | |
| WO | 2015/149928 A2 | 10/2015 | |
| WO | 2016/093960 A1 | 6/2016 | |
| WO | 2018/009546 A1 | 1/2018 | |
| WO | 2019086760 A1 | 5/2019 | |
| WO | 2020091942 A1 | 5/2020 | |
| WO | 2021025841 A1 | 2/2021 | |
| WO | 2021/076760 A1 | 4/2021 | |

OTHER PUBLICATIONS

S. Joe Qin & Thomas A. Badgwell, "A survey of industrial model predictive control technology," Control Engineering Practice, 11:733-764 (2003).

International Search Report and Written Opinion for International Application No. PCT/US2019/054465, entitled, "Apparatus and Methods for Non-Invasive Closed Loop Step Testing With Controllable Optimization Relaxation," dated Apr. 21, 2020.

Zhao, et al., "An Identification Approach to Nonlinear State Space Model for Industrial Multivariable Model Predictive Control," Proceedings of the American Control Conference, Philadelphia, PA, Jun. 1998.

International Search Report and Written Opinion for International Application No. PCT/US2013/024932, "Apparatus and Methods for Non-Invasive Closed Loop Step Testing Usin a Tunable Trade-Off Factor," dated May 2, 2013.

International Preliminary Report on Patentability for International Application No. PCT/US2013/024932, "Apparatus and Methods for Non-Invasive Closed Loop Step Testing Usin a Tunable Trade-Off Factor," dated Aug. 12, 2014.

Soliman, M., "Multiple Model Predictive Control for Wind Turbines with Doubly Fed Induction Generators," IEEE Transactions on Sustainable Energy, vol. 2, No. 3, pp. 215-225 (2011).

Mohamed, et al., "A Neural-Network-Based Model Predictive Control of Three-Phase Inverter with an Output LC Filter," Cornell University Library, ArXiv:1902.099643v3, XP081457097, whole document, Feb. 22, 2019.

"Notification of Transmittal of the International Search Report and The Written Opinion of the International Searching Authority, or the Declaration," for International Application No. PCT/US2020/042239, entitled "Apparatus And Methods To Build Deep Learning Controller Using Non-Invasive Closed Loop Exploration," dated Oct. 14, 2020.

Bhutani, N., et al, "First-Principles, Data-Based, and Hybrid Modeling and Optimization of an Industrial Hydrocracking Unit", Ind. Eng. Chem. Res., 45 (23), pp. 7807-7816 (2006).

Brill, et al., "Transportation of liquids in multiphase pipelines under low liquid loading conditions." Ph.D. Dissertation, The University of Tulsa (1995).

Caetano, "Upward vertical two-phase flow through an annulus," Ph.D. Dissertation, The University of Tulsa (1985).

European Search Report Application No. 17 751 159.9, entitled Computer System And Method For The Dynamic Construction And Online Deployment Of An Operation-Centric First-Principles Process Model For Predictive Analytics.' dated Jan. 21, 2020.

Hebert, D., "First-Principle Verus Data-Driven Models—Cost and Time and Skill Required to Develop an Application-Specific Model have Been Barriers to Using First-Principle Modeling Tools" http://www.controlglobal.com/articles/2008/200/ (2008).

http://web.maths.unsw.edu.au/.about.fkuo/sobol/ (2010).

International Search Report and Written Opinion for PCT/US2017/040725 dated Oct. 16, 2017., entitled "Computer System and Method for the Dynamic Construction and Online Deployment of

(56) References Cited

OTHER PUBLICATIONS an Operation-Centric First-Principles Process Model for Predictive Analytics".
International Search Report and Written Opinion received for PCT Patent Application No. PCT/US2020/031636, dated Jul. 15, 2020, 9 pages.
International Search Report and Written Opinion received for PCT Patent Application No. PCT/US2020/034530, dated Jul. 24, 2020, 9 pages.
International Search Report and Written Opinion received for PCT Patent Application No. PCT/US2020/055787, dated Jan. 29, 2021, 8 pages.
Pantelides C. C, et al., "The online use of first-principles models in process operations: Review, current status and future needs", Computers & Chemical Engineering, vol. 51, ISSN: 0098-1354, pp. 136-148 (2013).
Potocnik P, et al, "Neural Net Based Hybrid Modeling of the Methanol Synthesis Process", Neural Processing Letters, Kluwer Academic Publishers, No. 3, Jan. 1, 2000, 219-228. XP000949966.
Psichogios, D.C. and Ungar, L. H., "A Hybrid Neural Network-First Principles Approach to Process Modeling", AIChE Journal, 38: 1499-1511 (1992).
Tay et al., "Reluctant generalized additive modeling," Department of Statistics, and Department of Biomedical Data Science, Stanford University, Jan. 15, 2020, 20 pages.
Yang, "A study of intermittent flow in downward inclined pipes," Ph.D. Dissertation, The University of Tulsa (1996).
Yang, et al, "An integrated multi-task control system for fuel-cell power plants", Decision and Control and European Control Conference (CDC-ECC), 2011 50th IEEE Conference, Dec. 12, 2011, 2988-2993.
Yu et al., "Reluctant Interaction Modeling," Department of Statistics, University of Washington, Seattle, Washington, 98105, Jul. 22, 2019, 32 pages.
Zendehboudi et al., "Applications of hybrid models in chemical, petroleum, and energy systems: A systematic review," Applied Energy, 228: 2539-2566 (2018).
Zhang et al., "Unified model for gas-liquid pipe flow via slug dynamics—Part 1: Model development," Trans. Of the ASME, 25: 266-273 (2003).
Zhang et al., "Unified model for gas-liquid pipe flow via slug dynamics—Part 2: Model validation," Trans. Of the ASME, 25: 274-283 (2003).
International Preliminary Report on Patentability for PCT/US2019/054465 dated May 14, 2021 titled "Apparatus and Methods for Non-Invasive Closed Loop Step Testing with Controllable Optimization Relaxation".
International Preliminary Report on Patentability received for PCT Patent Application No. PCT/US2020/042239, dated Feb. 17, 2022, 8 pages.
https://www.google.com/search?q=deep+learning&rlz=1C1GCEA_enUS1008&oq=deep+learinig&aqs=chrome.1.69i57j0i10i433j0i10j0i10i131i433j46i10j0i10l3j0i10i433j0i10.5742j0j1&sourceid=chrome&ie=UTF-8. Downloaded from Internet Jun. 16, 2022.

\* cited by examiner

APPARATUS AND METHODS FOR NON-INVASIVE CLOSED LOOP STEP TESTING WITH CONTROLLABLE OPTIMIZATION RELAXATION

BACKGROUND

Process industries include those industries involved in petroleum processing, chemical processing, pharmaceutical processing, and the like. Each with respective processing plants, factories, and industrial processing systems. Multivariable Predictive Control (MPC) is the most widely used advanced process control technology in process industries, with more than 5,000 worldwide applications currently in service. MPC, which is sometimes also referred to as multivariate control (MVC), relies on dynamic models of an underlying process, e.g., linear dynamic models obtained by system identification. The dynamic models predict the process behavior (the controlled variables (CV)) and makes changes to the manipulated variables (MV), so that the MPC can keep the underlying process running inside a prescribed constraint set. When inside the constraint set, the MPC also makes changes relative to the MVs, so that the process behavior is optimized (as steady-state targets) based on an objective function.

A common and challenging problem is that MPC performance degrades over time due to inevitable changes in the underlying subject process, such as equipment modifications, changes in operating strategy, feed composition changes, instrumentation degradation, etc. Such degradation of control performance results in loss of benefits. Among all possible causes of control performance degradation, poor model accuracy is the primary factor in most cases. To sustain good control performance, the model needs to be periodically calibrated and updated.

However, it is a technically challenging and resource-intensive task to pinpoint a problematic model and re-identify a new model for replacement in a MPC application. Such efforts are disclosed in U.S. Pat. No. 6,819,964, herein incorporated by reference in its entirety. In a large scale MPC application, over a hundred process variables (e.g., MVs and CVs) may be involved. Conducting a re-test and re-identification by a conventional approach may take an experienced engineer weeks of intensive work and cause significant interruption to the normal operation.

The process industry has been looking for an automated, safe and less-invasive approach to conducting plant testing on a subject process for a while. In past generations of MPC, a process control engine calculated new steady-state targets every single control cycle, no matter how insignificant the increment change of the targets. The new steady-state targets were then used to calculate a new dynamic move plan, and the first move was written out to the subject process. Doing so guaranteed that the process controller (e.g., MPC controller) had an integration action that removed offset from the active CV limits that were caused by measurement noise, process disturbances, and model errors; but this approach often caused unwarranted overreaction to plant noise and the near colinearity present in the controller model. This approach, in turn, leds to excessive feedback correlation in collected data sets making the closed-loop data set unsuitable for model identification purposes. If purely closed-loop data was used with the process controller turned on, then the identified models were significantly biased (i.e., contained large errors). Often, the models identified from purely closed-loop data were not sufficiently accurate to drive the correct behaviour in a non-square MPC.

In U.S. Pat. No. 7,209,793, herein incorporated by reference in its entirety, an innovative approach for conducting plant testing was proposed that improved on the closed-loop step testing disclosed in U.S. Pat. No. 6,819,964. The step testing was conducted in an automated way with the process safe-guarded by a specially designed multivariable (MPC) controller. During the step testing, a process perturbation approach simultaneously perturbed multiple process input variables in a manner that maximized process outputs while maintaining process variables inside predefined operating constraints.

However, even using the above automated closed-loop step testing, the variable perturbation inevitably has some negative impact to the normal process operation; mainly, the loss of optimal operation performance. U.S. Pat. No. 9,513,610, herein incorporated by reference in its entirety, provided an innovative approach to address this issue by a tunable trade-off between optimal process operation and process perturbation. U.S. Pat. No. 9,513,610 discloses an apparatus and method to automatically conduct a process perturbation in such a way that useful data can be generated for modeling purpose, while the process is still in closed-loop control with relaxed economic optimization.

The trade-off between process perturbation and economic optimization during closed-loop step testing may be based on the relaxation of the economic optimization objective function of the controller. A typical economic optimization objective function consists of a linear combination of weighted manipulated variables (MV) and controlled variables (CV). Since different variables can have different weightings in the objective function (e.g., different cost factors), some variables can step away from their ideal steady-state targets in much larger or much smaller values (compared to the other variables) without violating the allover objective function trade-off tolerance. When this happens, sonic process variables can drift away from their desirable operating range and hence become a concern for process operation during the step testing.

SUMMARY

Embodiments of the present invention provide a new approach for performing step testing (e.g., non-invasive closed-loop step testing) of a dynamic process that addresses issues in previous approaches. The embodiments provide a way to perform economic optimization relaxation, such that the operating range of MVs and CVs during the step testing will not be skewed by the variations in the cost factors of MVs and CVs. There is a key difference between the new approach of the present invention disclosed herein and previous approaches. Namely, whereas previous approaches can achieve the trade-off between process perturbation and optimal control (as disclosed in U.S. Pat. No. 9,513,610), the new approach of the present invention better maintains the desirable operating range for each process variable while process perturbation is being performed during the step testing. Even if the economic objective function of the MPC controller is not well-defined, the new approach of the present invention is able to maintain each variable close to its optimal target value during performance of the process perturbation. This approach, in turn, can significantly reduce the need for re-tuning and run-time intervention of the MPC controller.

Embodiments of the present invention are directed to computer systems, apparatus, methods, and program products that increase performance in conducting step testing of an industrial process. The computer system comprises a user interface and a MPC controller (apparatus) that includes a target optimizer and a dynamic controller. The computer program product comprises a non-transitory computer-readable storage medium having code instructions stored or otherwise embodied thereon. The storage medium is operatively coupled to a processor, such that, when executed by the processor, the computer code instructions cause the processor to implement the elements of the embodiment.

The computer systems, methods, and program products configure a MPC controller that controls an industrial process at a plant or refinery, the industrial process having one or more process variables. For each of the one or more process variables, the computer systems, methods, and program products (e.g., via the target optimizer) receive an optimization giveaway tolerance representing an allowable range between a current value of the process variable and a target value for the process variable. In embodiments, the giveaway tolerance for each of the one or more process variables is defined by a user through a user interface. For each of the one or more process variables, the computer systems, methods, and program products determine if the current value of the process variable meets the received giveaway tolerance. In response to at least one of the process variables not meeting the received giveaway tolerance, the computer systems, methods, and program products adjust the configuration of the MPC controller in a manner that moves the at least one process variable toward the received giveaway tolerance. Using the adjusted configuration, the computer systems, methods, and program products calculate new target values for the one or more process variables. The computer systems, methods, and program products generate a dynamic move plan from the calculated new target values. The computer systems, methods, and program products add to the dynamic move plan perturbation signals calculated based on the adjusted configuration.

In embodiments, the configuration of the MPC controller includes an objective function. In some of these embodiments, the objective function is constructed for economic optimization based on minimum cost. In the embodiments, the computer systems, methods, and program products adjust the MPC controller configuration as follows. For each of the one or more process variables, the computer systems, methods, and program products calculate an optimal target value for the process variable using the objective function. The computer systems, methods, and program products determine whether to optimize the process variable based on the current value being within or outside the giveaway tolerance with respect to the calculated optimal target value. In response to determining not to optimize the process variable, the computer systems, methods, and program products adjust the objective function and the operating limit with respect to the process variable (relaxing optimization of the process variable values).

In some embodiments the adjusting of the objective function includes removing the process variable determined not to be optimized from the calculation performed by the objective function. The objective function may include a cost factor for the determined process variable, and the computer systems, methods, and program products remove the determined process variable by setting the cost factor to zero. The computer systems, methods, and program products may adjust the configuration of the MPC controller by modifying the high and low limits on each process variables already within the giveaway tolerances, such that calculation of the current values complies with the giveaway tolerance and creates rooms for the other process variables to optimize. If at least one process variable is outside its giveaway tolerances, the computer systems, methods, and program products may re-run the optimization (calculate new optimal targets) with the adjusted objective function and the adjusted configuration. The re-running forces the current values of the process variables outside the giveaway tolerance to move within or close to the giveaway tolerance. Using the adjusted objective function and the adjusted configuration (e.g., modified process variable), the computer systems, methods, and program products calculate the new target values.

In some embodiments, the computer systems, methods, and program products add the perturbation signals to the dynamic move plan as follows. The computer systems, methods, and program products calculate the perturbation signals by maximizing step size with respect to: (a) constraints on the one or more process variables and (b) the adjusted configuration. Step testing is performed on the industrial process using the calculated perturbation signals from the dynamic move plan. In some embodiments, the generation of the dynamic move plan further includes calculating control signals based on the adjusted configuration, and the calculated control signals from the dynamic move plan are used to adjust behavior (operation and effect) of the industrial process.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Example Multivariate Modeling and Control System

Figure 1A:
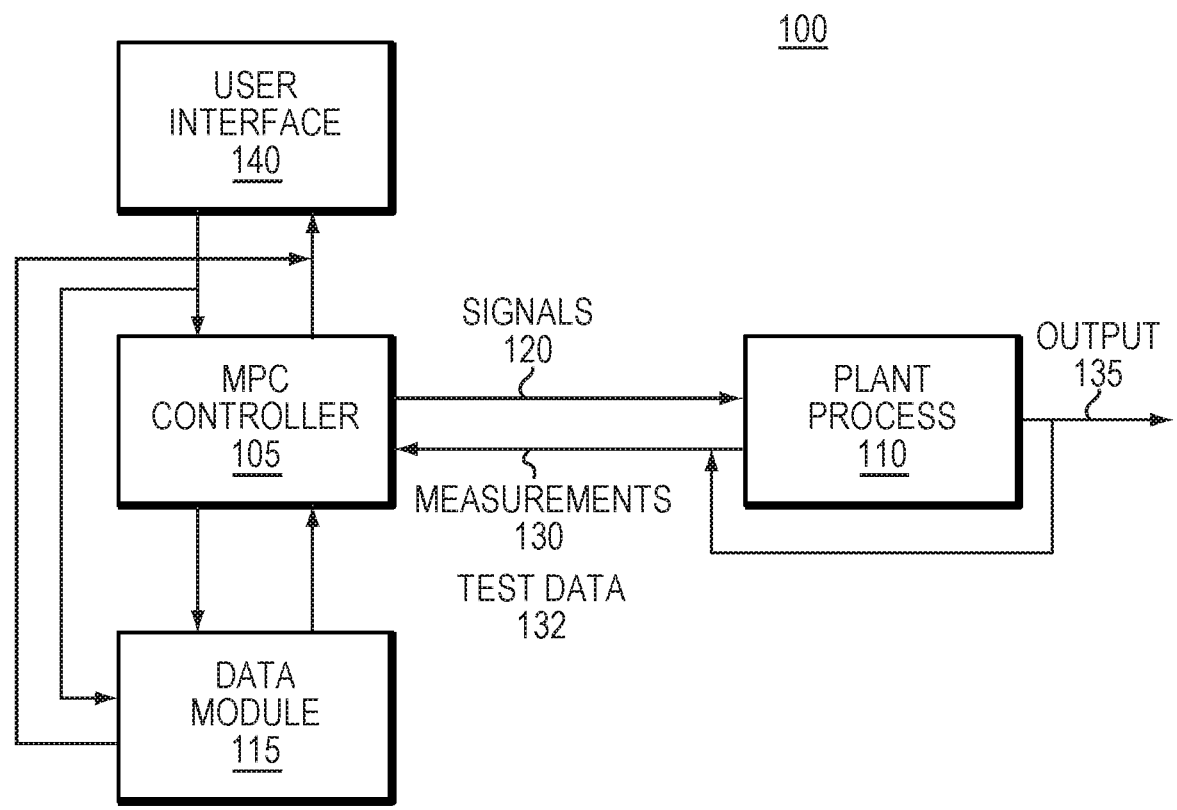
FIG. 1A is a schematic view of an example multivariate modeling and control system for executing some embodiments of the present invention.

FIG. 1A is a schematic view of an example multivariate modeling and control system 100 for executing some embodiments of the present invention. In embodiments, the system 100 of FIG. 1A executes the method 300 of FIG. 3 to increase step testing performance (improves optimization relaxation). In an example embodiment, the multivariate modeling and control system 100 is DMC3® by Aspen Technologies, Inc., Bedford, MA In the embodiments of FIG. 1A, the multivariate modeling and control system 100 includes a user interface display 140, that is communicatively connected to a MPC controller 105 and automated data selection and on-line model identification module (data module) 115. The interface connection between the user interface display 140 and each of the MPC controller 105 and data module 115 may be a wired connection or wireless connection, such as WiFi or Bluetooth. In some embodiments, as shown in FIG. 1A, the MPC controller 105 and the data module 115 may be configured as separate subsystems of one or more processors for controlling and modeling a plant process 110. In these embodiments, the MPC controller 105 and the data module 115 may be communicatively coupled by a wired or wireless connection, such as WiFi or Bluetooth. In other embodiments, the data module 115 may be configured as part of the MPC controller 105 subsystem, which is implemented as one or more processors for controlling and modeling a plant process 110. The MPC controller 105 is further communicatively connected to the plant process 110 (of a physical plant, such as a petrochemical plant, chemical processing plant, or the like).

The data module 115 generates at least one of linear and non-linear models (MPC models) for defining the behavior of the plant process 110. The MPC controller 105, communicatively coupled to the data module 115, uses the generated MPC models to predict, optimize, and control the future behavior of the plant process 110. In example embodiments, the MPC models generated at data module 115 for optimization of the plant process 110 may include objective functions that determine steady-state targets defining the optimal behavior (operation and output) of the plant process 110 based on cost factors. The data module 115 may provide parameters for a user or system to define the behavior of the plant process 110 as a generated MPC model, including parameters for defining MVs and CVs of the plant process 110 and defining optimization giveaway tolerance for each variable. These parameters may be displayed at user interface display 140 for the user or system to define the MPC model for the plant process 110. The data module 115 may also define the behavior of the plant process 110 as generated MPC models based on plant measurements 130 and test data 132 (e.g., from plant process output 135) received at the MPC controller 105 from the physical plant, historical process data (e.g., from a historian database), and such. In some embodiments, the generated MPC models (or provided parameters) may be stored in memory at, or communicatively coupled to, data module 115, and may be loaded to the data module 115 at a later time for defining the behavior of a plant process 110.

The MPC controller 105 loads and solves the generated MPC models to predict the future behavior of the plant process 110, as defined by CV values, in response to changes in the process conditions, as determined from plants measurements 130, test data 132, and other plant process output 135 received from MV values of the plant process. The MPC controller 105 also loads and solves the generated MPC models to optimally adjust the plant process 110, by adjusting the MVs, in response to the plant process output 135, and modeled predictions. Specifically, generated MPC models may be used to optimally adjust the MVs to ensure that the plant process 110 continues to run with the most optimal economic benefit possible inside a prescribed constraint set.

The MPC controller 105 transmits control signals 120 comprising control moves to the plant process 110 (at the physical plant) to push the plant process 110 (e.g., program components at the physical plant based on the adjusted MVs) towards the configured optimized behavior. The MPC controller 105 may also transmit perturbation signals 120 comprising step moves to the plant process 110 to generate data based on step testing (e.g., non-invasive closed-loop step testing). The physical plant is generally configured with a distributed control systems (DCS) or other plant process control system that adjusts (control moves) the plant process 110 based on the control signals and tests (step moves) the plant process 110 based on perturbation signals. The DCS transmits plant measurements 130, testing data 132, and other process output 135 of the plant process 110 back to the MPC controller 105 for further predictions and optimization of the plant process 110.

Example Plant Process Control

Figure 1B:
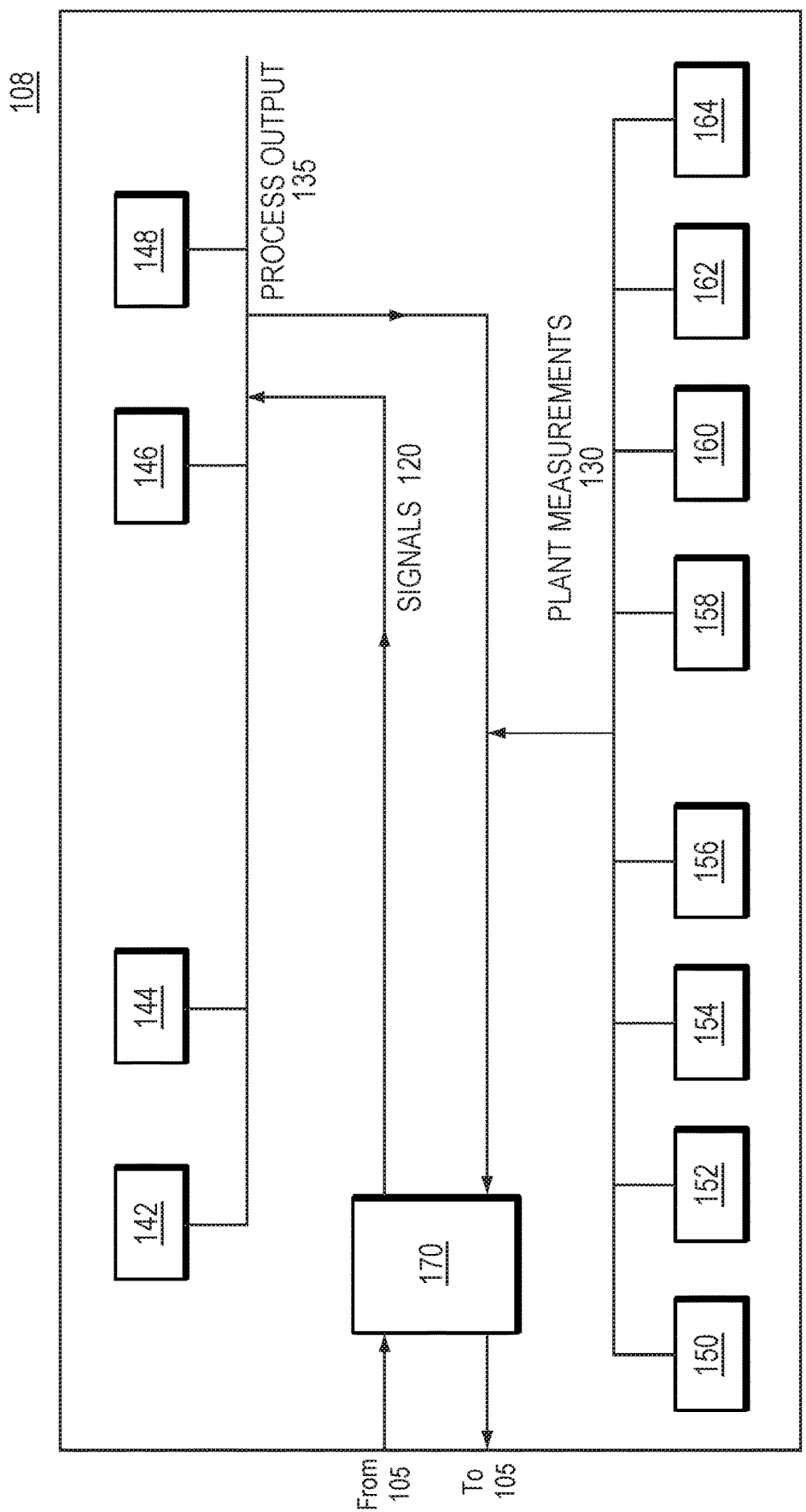
FIG. 1B is a schematic view of example process unit for measuring and controlling a plant process in embodiments of the present invention.

FIG. 1B is schematic view of example process unit 108 containing plant equipment for measuring and controlling the plant process 110 in embodiments of the present invention. A plant process 110 is generally performed in a physical plant configured with one or more plant process control systems (or distributed control system (DCS) systems) 170 to measure and control the plant process 110. In FIG. 1B, the plant process control system 170 is configured (and equipped) to take plant measurements 130 of the parameters associated with the plant process 110, such as temperature, pressure, and flow. Specifically, the plant process control system 170 communicates with physical sensors configured at the plant to determine the current plant measurements associated with the plant process 110. For example, the plant process control system 170 may communicate with flow meter 150 to determine column jet flow associated with the plant process 110, pressure sensor 152 to determine column overhead pressure associated with the plant process 110, temperature sensor 154 to determine column overhead temperature associated with the plant process 110, and temperature sensor 156 to determine feed stream temperature associated with the plant process 110. For further example, the plant process control system 170 may also communicate with flow meter 158 to determine heater feed pass flow associated with the plant process 110, pressure sensor 160 to determine fuel gas pressure associated with the plant process 110, pressure sensor 162 to determine steam pressure associated with the plant process 110, and pressure sensor 164 to determine reflux drum pressure associated with the plant process 110.

The plant process control system 170 may be further configured to transmit the plant measurements 130 determined by the physical sensors 150, 152, 154, 156, 158, 160, 162, and 164 to the MPC controller 105. The MPC controller 105 may use the transmitted plant measurements 130 in the generated MPC models to determine the current behavior associate with the respective MVs (e.g., column jet flow, column overhead pressure, column overhead temperature, feed stream temperature, and heater feed pass flow) and respective CVs (e.g., fuel gas pressure, steam pressure, and reflux drum pressure) of the plant process 110. Based on the plant measurements 130, the MPC controller 105 may make updated predictions for the future behavior of the plant process 110 and further adjust the MVs to optimize the behavior of the plant process 110.

The MPC controller 105 further transmits control signals 120 to the plant process 110 (at the physical plant) configured to push the plant process 110 (e.g., program components at the physical plant based on the further adjusted MVs) towards the optimized behavior. The plant process control system 170 receives the control signals 120 and is configured (and equipped) to adjust (program) physical components of the plant, such as an actuator 142, valve 144, pump/compressor 146, and gauges 148, in accordance with the further adjusted MVs. The plant process control system 170 may capture the updated settings of the adjusted physical components (actuator 142, valve 144, pump 146, and gauges 148), as part of the process output 135, along with updated plant measurements 130 from the physical sensors 150, 152, 154, 156, 158, 160, 162, and 164. The plant process control system 170 may, then, transmit the updated plant measurements 130 and process output 135 to the MPC controller 105 to be used by the MPC models for further prediction and optimization of the plant process 110.

In FIG. 1B, the plant process control system (or DCS) 170 is also configured (and equipped) to perform step testing on the plant process 110, such as on the equipment 142, 144, 146, 148, etc. To do so, the MPC controller 105 calculates and transmits perturbation signals 120 programmed with a step test sequence for MVs to the plant process 110 (at the physical plant). The plant process control system 170 receives the perturbation signals 120 and is configured (and equipped) to perform step testing by step moving the plant process, such as an actuator 142, valve 144, and pump/compressor 146, in accordance with the programmed step test sequences. The plant process control system 170 may capture the results of moving the plant process (actuator 142, valve 144, pump 146, and gauges 148), as part of the process output 135 (as test data 132). The plant process control system 170 may, then, transmit the test data 132 to the MPC controller 105 to be used by the MPC models for further prediction and optimization of the plant process 110.

Example MPC Controller

Figure 1C:
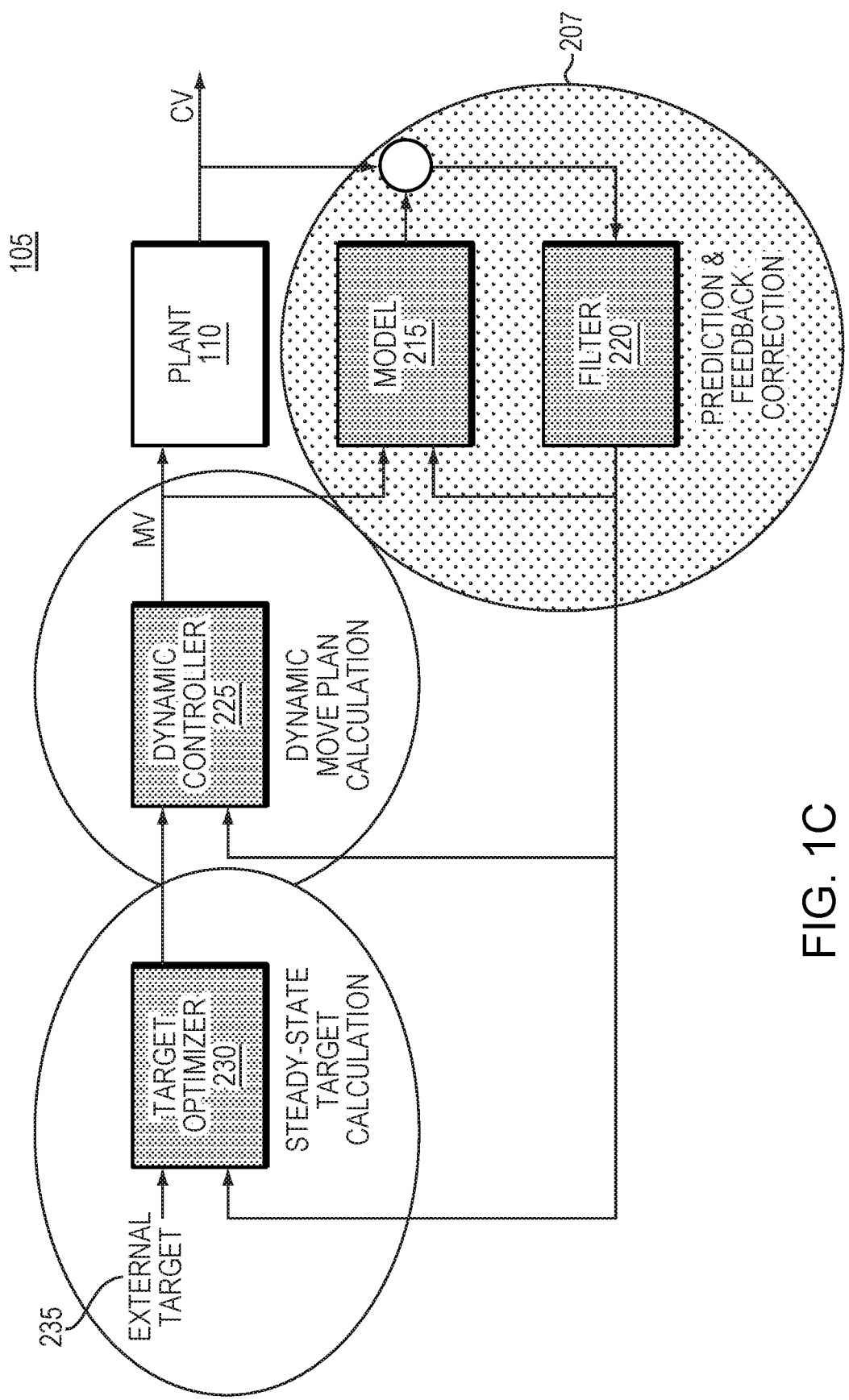
FIG. 1C is a block diagram of an example MPC controller in embodiments of the present invention.

FIG. 1C is a block diagram of an example MPC controller 105 in embodiments of the present invention. In some embodiments, the MPC controller 105 is configured as a subsystem of the process modeling system 100 of FIG. 1A. In embodiments, the MPC controller 105 of FIG. 1C executes the method 300 of FIG. 3 to increase step testing performance (improves optimization relaxation). In the embodiment of FIG. 1C, the data module 115 is integrated into the modules of the MPC controller 105 subsystem, which are configured as one or more processors for controlling and modeling a plant process 110. There are three forces driving the movement of the MVs in a typical MPC controller 105: (1) the feedback correction; (2) the steady-state target optimization; and (3) the dynamic move plan optimization.

The MPC controller 105 comprises a prediction and feedback correction module 207, which includes model 215 for predicting the behavior of the plant process 110. Note, model 215 may be generated by the data module 115, as in FIG. 1A, rather than generated by the prediction and feedback correction module 207, as in FIG. 1C. The prediction and feedback correction module 207 also includes filter 220, which provides feedback correction by removing the prediction bias from the calculation (solutions) determined by model 215. In some embodiments, the filter 220 may use the difference between plant measurements 130 and model predictions as a bias to shift the future predictions, and in other embodiments the filter 220 may comprise a Kalman Filter. See, e.g., S. Joe Qin & Thomas A. Badgwell, "*A survey of industrial model predictive control technology*," Control Engineering Practice, 11:733-764 (2003), which is incorporated herein by reference in its entirety. The prediction and feedback correction module 207 may predict the plant process 110 based on historical values (open-loop prediction) retrieved from computer memory (e.g., historian database). The prediction and feedback correction module 207 may also predict the plant process 110 based on the adjusted values (closed-loop prediction) of MVs and/or the filtered (corrected feedback) values of CVs from plant measurements 130 and output 135 of the plant (i.e., data from physical plant sensors of FIG. 1B).

In the MPC controller 105 of FIG. 1C, the modeled (and filtered) solutions from the prediction and feedback correction module 207 are provided to the target optimizer 230 for determining optimal steady-state target values for the MVs. The target optimizer 230, as part of the external target 235, uses an optimization model for formulating steady-state targets (including optimal MV values) for a given run cycle of the plant process 110. Note, the target optimizer 230 may use an optimization model generated by the data module 115, as in FIG. 1A, rather than generated by the target optimizer 230, as in FIG. 1C. The target optimizer 230 may formulate the steady-state targets (optimal MV values) based on an economic objective function configured for minimum cost by the use of a cost factor defined for each variable.

In the MPC controller 105 of FIG. 1C, the steady-state targets calculated by target optimizer module 230 are provided to the dynamic controller 225 (e.g., as control signals 120). The dynamic control module 225 uses the steady-state targets to calculate a move plan for the plant process 110. As such, the MPC controller 105 of the present invention performs two separate optimization functions for optimizing a plant process 110. The first optimization function is a steady-state target formulation (performed at the target optimizer 230) which optimizes an objective function while preserving variable constraints. The second optimization function is the dynamic move plan calculation (performed at the dynamic control module 225) which generates control moves to drive the variables toward the steady-state targets in an optimally determined time series. In embodiments of the present invention, perturbation signals (step moves) are also added to the dynamic move plan for each or a selected list of MVs. The perturbation signals are used in performing step testing of the process 110.

Closed-Loop Step Testing

The accuracy of the model 215 of the MPC 105 places an upper limit on the obtainable closed-loop performance of the multivariable modeling and control system 100. However, there is a finite limit imposed on the obtainable model accuracy. This is due to the approximation error introduced by representing the real process, which is often non-linear, with linear models, and the ability to identify the model through a system identification process based on observed process data that is usually corrupted by noise and disturbances.

In general, the most cost-effective way to derive accurate models of a large-scale process unit 108, is to vigorously perturb the process unit 108 with suitable test signals (perturbation signals) 120 without exceeding safety or operability constraints (referred to as closed-loop step testing). The process perturbations must cover the full amplitude and frequency range of the process unit 108. Several different types of test signals can be used, including steps, pulses, random white noise sequences, of pseudo-random-binary (PRBS) signals. In the process control industry, step test signals are widely used because it is easy to generate these signals manually, and the procedure is referred to as step testing. For the purposes of this discussion, perturbing a process unit 108 with the intent of identifying an empirical dynamic model, is referred to as step testing, whatever test signals are used.

Step testing consists of making sufficiently large orthogonal and independent step changes in all the MVs of the process unit 108 under careful supervision. MVs are those that are adjusted through actuators coupled to respective control valves 144, pumps/compressors 146, etc. forming the process unit 108 and are for example feed rates, flow rate, temperature of a vessel, and the like. The step test data is then used in system identification algorithms to fit dynamic models 215 to the observed process responses. In order to minimize the duration and consequent cost of the step test, these step changes must be of sufficient amplitude to clearly observe the dynamic behavior of the process and maximize the signal to noise ratio. Correlation (dependence) between the MVs must to be minimized to ensure that accurate models can be identified.

Model accuracy results from using large step changes, ensuring minimal correlation between MVs and minimal feedback correlation, and ensuring that the step test sequence spans the full frequency range from very fast to very slow steps relative to the Time-to-Steady-State (TTSS) of the process. Unwanted feedback correlation results from the need to make frequent correcting moves in the MVs to counteract the effect of large unmeasured disturbances, and can degrade the accuracy of the model.

The perturbation signals 120 for step testing of the process unit 108 may be generated by the dynamic controller 225 and added to the dynamic move plan for transmission to the process unit 108. In embodiments of the present invention, the perturbation signals 120, which include programmed step changes (moves) to the MVs used in the step testing, are calculated to maximize the step size subject to the process and economic constraints. In embodiments of the present invention, the MPC controller 105 may relax economic optimization on variables to provide scope for perturbing the process 110 (i.e., to maintain desirable operating range for each process variable while performing perturbation). The dynamic move plan calculated by the dynamic controller 225, including signals (control signals and perturbation signals) 120, is then transmitted to the plant unit 108. The process control system 170 uses the control signals to control/move the plant process 110 toward optimized behavior, and the perturbation signals to perform step testing (e.g., non-invasive closed-loop step testing) of the plant process 110. The move plan is also provided back to model 215 of the predictions and feedback correction module 207 for further predicting the behavior of plant process 110 (so the cycle can begin again in iteration).

Traditional MPC Controller Execution

Figure 2A:
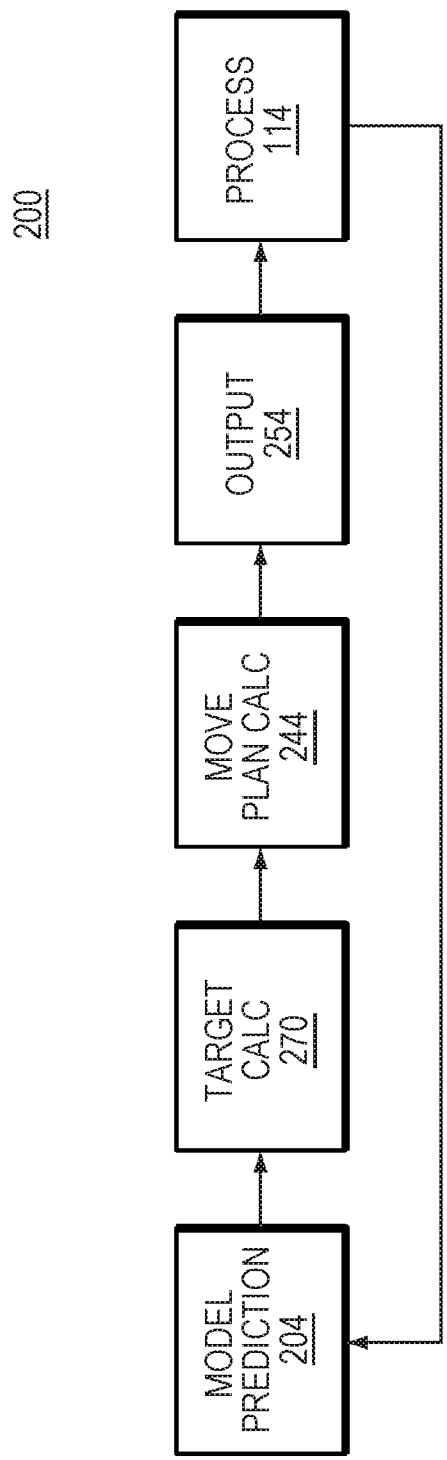
FIG. 2A is a flow diagram depicting traditional execution of an older version MPC controller.

FIG. 2A is a system diagram of traditional execution of an older version MPC controller 200, such as older versions of DMCplus® by Aspen Technology Inc. of Bedford, Massachusetts MPC controller 200 may be an older version of the MPC controller of FIGS. 1A and 1C. The older version MPC controller 200 (at an older version prediction module) generates 204 a model prediction for each controlled process variable (CV) of a subject process 114. At each execution cycle, the MPC controller 200 (at an older version target optimizer) calculates 270 a steady-state target value for MVs based on an objective function. The MPC controller 200 calculates 270 an updated steady-state target value at each cycle, no matter how insignificant the incremental change in process variables of a subjet process 114. The MPC controller 200 (at an older version dynamic controller) then uses the calculated steady-state target value to calculate 244 a dynamic move plan. The MPC controller 200 transmits moves (output 254) of the calculated dynamic move plan to control and test the subject process 114.

Improved MPC Controller Execution

Figure 2B:
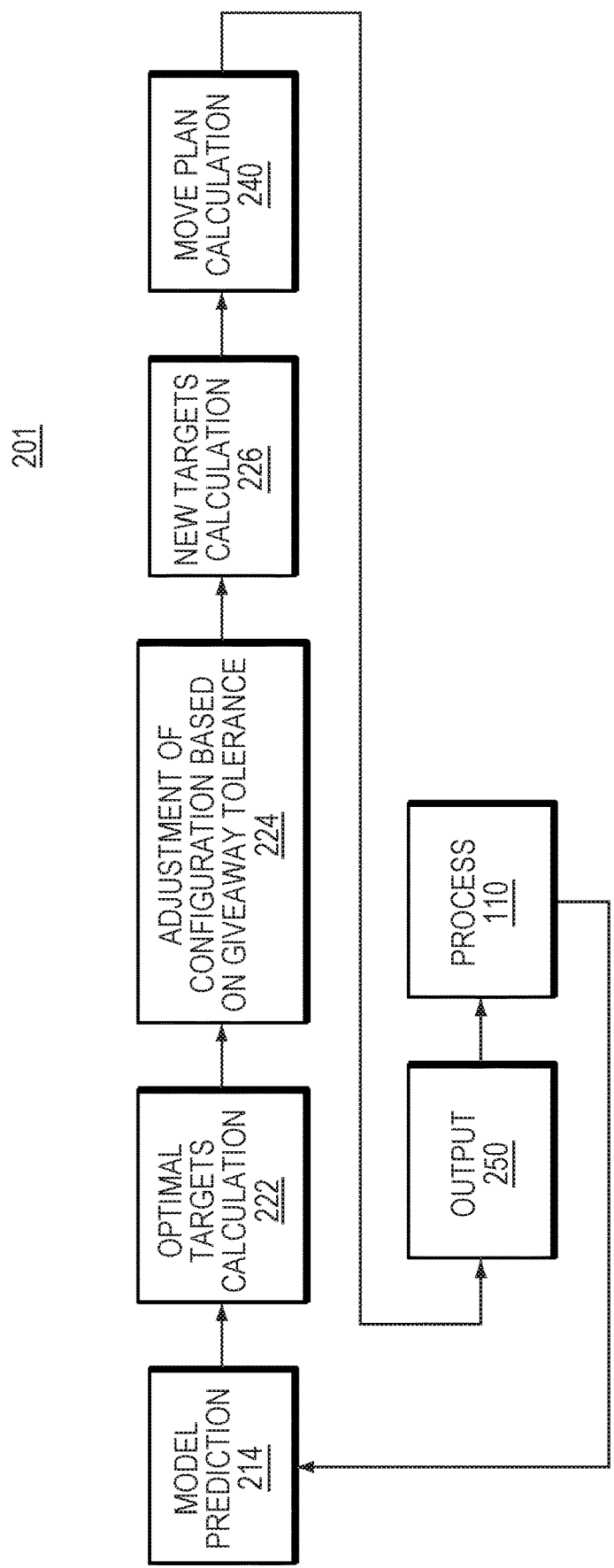
FIG. 2B is a flow diagram depicting example execution of an MPC controller in embodiments of the present invention.

FIG. 2B is a system diagram of execution of an improved MPC controller 201 that increases step testing performance in embodiment of the present invention. MPC controller 201 is an embodiment of MPC controller 105 of FIGS. 1A and 1C. The MPC controller 201 (prediction module 207) generates 214 a model prediction for each CV of a subject process 110 based on an MPC model, past inputs, and previous prediction errors. At each execution cycle, the MPC controller 201 (target optimizer 230) calculates 222 a steady-state target value for each MV and CV based on an objective function (J) and subject to constraints of the subject process 110. In embodiments of the present invention, the MPC controller 201 calculates 222 the target value (ideal optimal target value) for each variable using an objective function formulated based on operation optimization (profit maximization, or cost minimization configuration; also referred by the term "Min Cost"). In other embodiments, the MPC controller 201 may calculate the target values using an objective function formulated based on minimum move control (constraint control configuration; also referred by the term "Min Move").

Unlike the traditional MPC controller 200 of FIG. 2A, the MPC controller 201 of the present invention relaxes the optimization of process variables to allow scope for each process variable to be perturbed. To do so, the MPC controller 201 is configured to receive an optimization giveaway tolerance for each variable. In some embodiments, the optimization giveaway tolerance is user-defined (e.g., via user interface 140). The optimization giveaway tolerance represents an allowable range between a current value of the variable and the target value for the variable. Based on the optimization giveaway tolerances, the MPC controller 201 selects which variables to optimize in the subject process. For each variable not selected (i.e., the variable meets its optimization giveaway tolerance), the MPC controller 201 (target optimizer 230) adjusts 224 the current configuration (e.g., the current operating limits of the variable, the objective function, etc.) with respect to the optimization giveaway tolerance for that variable. This adjustment 224 creates room (scope) to optimize the selected variables, while relaxing optimization on the variables not selected (already within their optimization giveaway tolerances). The MPC controller 201 (target optimizer 230) then calculates 226 a new steady-state target value for each variable using the adjusted objective function.

The MPC controller 201 (dynamic controller 225) then uses the calculated steady-state target value to calculate 240 a dynamic move plan (with control signals). The MPC controller 201 also calculates and adds perturbation signals to the dynamic move plan for use in step testing (e.g., non-invasive closed-loop step testing). The MPC controller 201 transmits output 250 of the calculated dynamic move plan in the form of signals (control signals and perturbation signals) 120 to the process control system (or DCS) 170 to control/test the subject process 110. The process control system 170 control moves and/or step moves the physical components of the plant, such as an actuator 142, using the signals.

Method of Increasing Step Testing Performance

Figure 3:
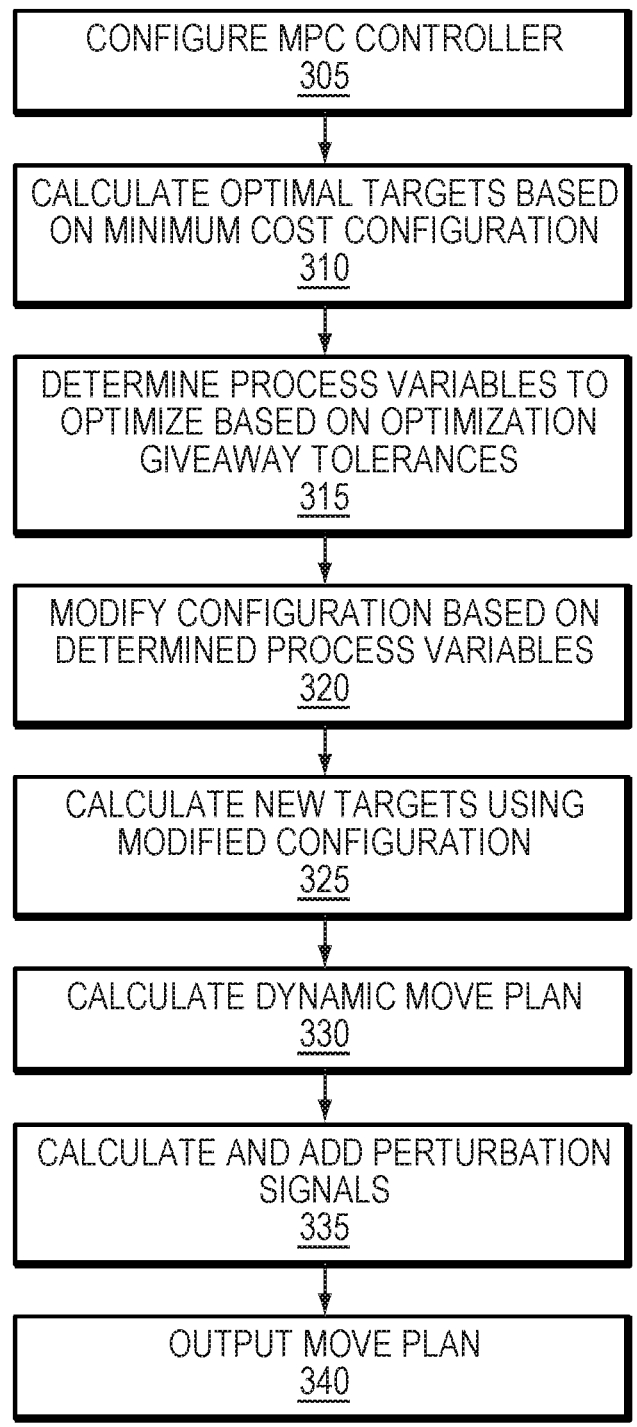
FIG. 3 is a flow chart depicting an example method of increasing performance in conducting step testing in embodiments of the present invention.

FIG. 3 an example method 300 for increasing performance in step testing (e.g., non-invasive closed-loop step testing) an industrial process in embodiments of the present invention. The example method 300 enables performing step testing of the industrial process with improved optimization relaxation. To do so, the example method 300 maintains process variables (MVs and CVs) of the industrial process close to their optimal values while perturbing the process variables during the step testing.

The method 300 (at step 305) begins with an initial configuration of a MPC controller. In embodiments, the MPC controller of method 300 may be the MPC controller 201 of FIG. 2B. A generic process controlled by the configured MPC controller can be described as follows:

$$Y = G*U \tag{1}$$

Where, G is the transfer function or gain matrix, U and Y are input process variables and output process variables, respectively:

U=[u1, u2, um], m≥1
Y=[y1, y2, yn], n≥1

The process operation constraints can be described as:

$$UL < U < UH \tag{2}$$

$$YL < Y < YH \tag{3}$$

Where, UL and UH are input variable low and high limits, and YL and YH are output variable low and high limits, respectively.

J(x) is an objective function representing certain measurements about a given variable x.

In practice, a feasible solution may not be found such that Equations (1), (2) and (3) are satisfied simultaneously, which means that some of CV variables must give up their limits. It is a common practice that a set of achievable CV limits is identified first before the calculation of MV and CV targets:

$$\min_{U} J(E)$$

Subject to: Y=G*U+E, and Equations (2) and (3)

Where, E is a relaxation vector. Then, the achievable CV limts, YL* and YH*, are defined as:

$yl^*_i = yl_i + e_i$, if $e_i < 0$ $yh^*_i = yh_i + e_i$, if $e_i > 0$ $$i = 1, 2, \ldots, n \tag{4}$$

For the sake of simplicity without loss of generality, the achievable CV limits (YL* and YH*) are assumed to be used in the target calculations in the place of nominal CV limits for the remaing discussions.

The method 300, at step 310, calculates an ideal optimal steady-state target value for each process variable (MV and CV) using a minimum cost ("Min Cost") configuration. In embodiments, these ideal optimal target values are calculated by the target optimizer 230 of FIG. 1C. In method 300, the controller target calculation for Min Cost are represented by an objective function consisting of cost factors associated with each MV and CV (or other variations), subject to process constraints such as MV and CV limits:

$$\min_{U} J_{cost}(U, Y) \tag{5}$$

Where, $J_{cost}(U,Y) = \Sigma_{i=1}^{i=m} c_i * u_i + \Sigma_{j=1}^{j=n} c_j * y_j$ and $c_i$ is the cost factor for the ith manipulated variable and $c_j$ is the cost factor for the jth controlled variable To calculate ideal optimal target values, the method 300 (step 310) solves the optimization problem defined by Equations (1)-(5). The resulting ideal optimal targets from the Min Cost target calculation normally force the process variables moving to their active constraints (all degrees of freedom are consumed and the calculated dynamic move plan 240 attempts to maintain the process variables at these active limits). As the process requires scope (room) to enable for each process variable to be pertubed, the method 300 relaxes the optimization of variables to provide this scope as follows.

The method 300, step 315, determines a set of the MVs and CVs to optimize based on an optimization giveaway tolerance defined for each MV and CV. The optimization giveaway tolerance represents an allowable range between a current value of a MV or CV and the ideal optimal target value for the MV or CV. The optimization giveaway tolerance for each MV and CV may be specified by a user (e.g., via user interface 140 of FIG. 1A). Based on the optimization giveaway tolerance for each MV and CV, the MVs and CVs are divided into two sets. The first set contains the MVs and CVs which meet their optimization giveaway tolerances. That is, the MVs and CVs in the first set have current values that, with respect to their ideal optimal target values (calculated in step 310), are within their respective optimization giveaway tolerances. The second set contains the MVs and CVs which do not meet their optimization giveaway tolerances (are to be optimized by the method 300). That is, the MVs and CVs in the second set have current values that, with respect to their ideal optimal target values (calculated in step 310), are outside their respective optimization giveaway tolerances.

For the MVs and CVs in the second set, the method 300, at step 315, maintains these MVs and CVs in the objective function (Equation 5) with their original settings (e.g., cost factors remain unchanged). The method 300, at step 320, modifies the configuration of the MPC controller with respect to the variables in the first set (to relax their optimization). To do so, for each MV and CV in the first set, method 300 (step 320) modifies the high and low limits, UH and UL for MVs and YH and YL for CVs, such that the calculation of a given MV or CV value complies with its optimization giveaway tolerance, with respect to its ideal optimal target values and also creates room (scope) for the process variables in the second set to be optimized. The method 300 (step 320) also adjusts the objective function (Equation 5) by removing the MVs and CVs of the first set from the objective function (Equation 5). To do so, the method 300 (step 320) may set the cost factor for each of the MVs and CVs of the first set in the objective function (Equation 5) to zero.

The method 300, at step 325, calculates new steady-state target values (re-runs the optimization) for the MVs and CVs using the modified configuration from step 320. In embodiments, these new target values are calculated by the target optimizer 230 of FIG. 1C. To calculate these new target values, the method 300 (step 325) again solves the optimization problem defined by Equations (1)-(5) with the modified configuration, including the adjusted objective function (Equation 5) and modified MVs and CVs limits of the first set. Since the variables in the first set are removed from the adjusted objective function, thereby not competing with the variables in the second set, the calculation of the new target values attempts to move (force) as many MVs and CVs in the second set as possible within (or close to) their respective optimization giveaway tolerances.

The method 300, at step 330, calculates a dynamic move plan based on the new target values for the MVs and CVs. In embodiments, the dynamic move plan is calculated by the dynamic controller 225 of FIG. 1C. This move plan is designed to bring the variables to the new target values as fast as possible, subject to the process constraints defined by Equations (1)-(4). The move plan includes control signals (embodying control moves) that adjust the behavior of the process toward the new target values. The method 300, at step 335, calculates and adds perturbation signals to the dynamic move plan for each or a selected list of the MVs. The perturbation signals are calculated by maximizing step size of the MVs subject to the process constraints defined by Equations (1)-(4) and the modified configuration resulting from step 320. The perturbation signals (embodying step moves) are used to perform the step testing on the industrial process.

The perturbation signal is calculated as follows. The method 300 denotes the new target calculated in step 325 as $(U^*, Y^*)$, and $\{du_i\}$ and $\{dy_j\}$ as the optimization giveaway tolerances for MVs and CVs, respectively. To step the kth manipulated variable, $u_k$, the method 300 determines the step size by:

$$\max_{u_k} |u_k - u_k^*| \quad (6)$$

Subject to:

$$u^*_k - du_k \le u_k \le u^*_k + du_k, \ u^*_k \subset U^*$$

$$u_i = u^*_i \text{ for } \ne k \text{ and } i=1, \ldots, m, \ u^*_i \subset U^*$$

$$y^*_j - dy_j \le y_j \le y^*_j + dy_j, j=1, \ldots, n, \ y^*_j \subset Y^*$$

and Equations (1), (2), (3), and (4)

The method 300 then superimposes the step size for the kth manipulated variable, $(u_k - u^*_k)$, onto the dynamic move plan.

The method 300, at step 340, outputs the dynamic move plan (containing control signals and perturbation signals) from the MPC controller to be implemented to dynamically control/step the process by a process control system (DCS). In embodiments, process control system (DCS) is the process control system 170 of FIG. 1B. The process control system implements the dynamic move plan over a certain number of execution cycles of the MPC controller and subject to dynamic constraints on the process. Normally, the process control system needs to divide a large move (control move or step move) contained in the dynamic move plan into multiple smaller moves over a certain time period in order not to upset the process operation.

Using the dynamic move plan calculated based on the new target values (calculated in step 325), the desirable operating range for each process variable can be maintained while process perturbation is being performed during the step testing. Even if the economic objective function (Equation 5) of the MPC controller was not well-defined, using the dynamic move plan formulated from the modified configuration the process variables are able to be maintained close to its optimal target value during performance of the process perturbation. This, in turn, can significantly reduce the need for re-tuning and run-time intervention of the MPC controller.

Digital Processing Environment

Figure 4:
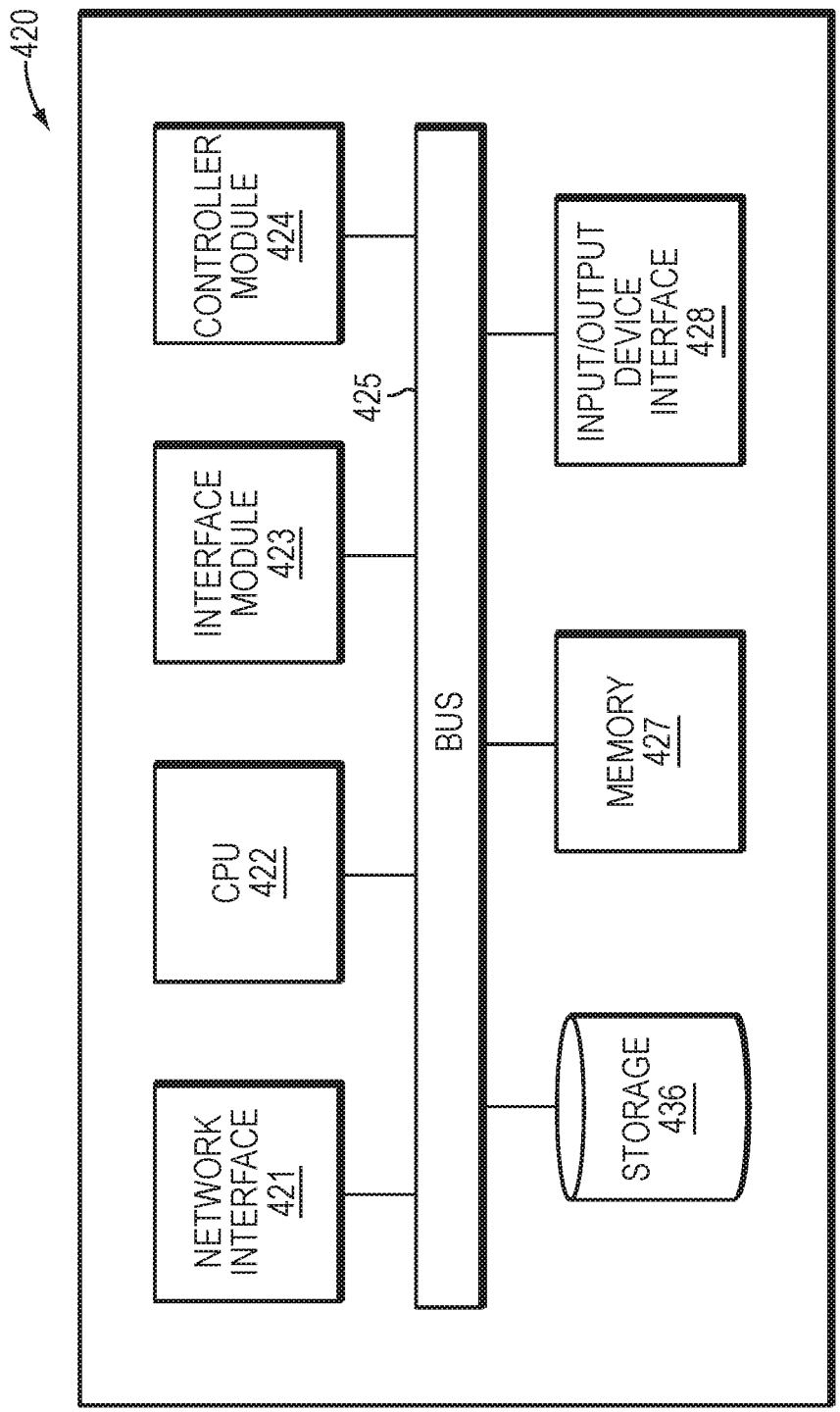
FIG. 4 is a block diagram of a computer (or digital processing) system for modeling and controlling an industrial process according to at least one embodiment of the present invention.

FIG. 4 is a simplified block diagram of a computer-based system 420 that may be used for modeling and controlling plant processes according to an embodiment of the present invention. The computer-based system 420 may be system 100 of FIG. 1A, system 170 of FIG. 1B, system 105 of FIG. 1C, etc. The system 420 comprises a bus 425. The bus 425 serves as an interconnector between the various components of the system 420. Connected to the bus 425 is an input/output device interface 428 for connecting various input and output devices such as a keyboard, mouse, display (e.g., user interface 140 of FIG. 1A), speakers, etc. to the system 420. A central processing unit (CPU) 422 is connected to the bus 425 and provides for the execution of computer instructions. Memory 427 provides volatile storage for data used for carrying out computer instructions. Storage 436 provides non-volatile storage for software instructions, such as an operating system (not shown). In particular, memory 427 and/or storage 436 are configured with program instructions implementing methods and/or modules 105, 115, 201, 207, 215, 220, 225, 230, and 300 for controlling and testing a process unit, as detailed in FIGS. 1A, 1B, 1C, 2B, and 3. The system 420 also comprises a network interface 421 for connecting to any variety of networks known in the art, including cloud, wide area networks (WANs) and local area networks (LANs).

Further connected to the bus 425 is an interface module 423 (e.g., user interface display 140 of FIG. 1A). The interface module 423 is configured to enable the user to specify optimization giveaway tolerances for process variables. The interface module 423 may provide input and output functions to the user through any means known in the art. For example, the interface module 423 may display MV parameters that are stored on the storage device 436 or memory 427 for enabling the user to make decision regarding optimization giveaway tolerance values. For further example, the interface module 423 may enable the user to specify input data (e.g., optimization giveaway tolerance values) that is transmitted to any point communicatively coupled to the system 420 via the network interface 421 and/or input/output device interface 428.

The system 420 further comprises a controller module 424 (e.g., MPC controller 105 of FIGS. 1A, 1B, and 1C, and 201 of FIG. 2B) that is communicatively/operatively coupled to the interface module 423. The controller module 424 is configured to formulate optimal steady-state targets using an objective function configured based on minimum cost, determine process variables to optimize based on optimization giveaway tolerance values, and calculate new steady-state targets based on the optimized process variables. The controller (optimizer) module 424 may formulate steady-state targets through any means known in the art. For example, the optimizer module 424 may store process variable values and the objective function, such as in an array, on the storage device 436 or memory 427. For another example, the optimizer module 424 may formulate the steady-state values by means of the CPU 422 via the bus 425. For further example, the optimizer module 424 may retrieve optimization giveaway tolerance values from any point communicatively coupled to the system 420 via the network interface 421 and/or input/output device interface 428.

It should be understood that the example embodiments described herein may be implemented in many different ways. In some instances, the various methods and machines described herein may each be implemented by a physical, virtual, or hybrid general purpose computer, such as the computer system 420. The computer system 420 may be transformed into the machines that execute the methods described herein, for example, by loading software instructions into either memory 427 or non-volatile storage 436 for execution by the CPU 422. Further, while the interface module 423 and optimizer module 424 are shown as separate modules, in an example embodiment these modules may be implemented using a variety of configurations.

The system 420 and its various components may be configured to carry out any embodiments of the present invention described herein. For example, the system 420 may be configured to carry out the methods and/or modules 105, 115, 201, 207, 215, 220, 225, 230, and 300 described hereinabove in relation to FIGS. 1A, 1B, 1C, 2B, and 3. In an example embodiment, the interface module 423 and controller module 424 may be implemented in software that is stored on the memory 427 and/or storage device 436. In such an example embodiment, the CPU 422 and the memory 427 with computer code instructions stored on the memory 427 and/or storage device 436 implement an interface module that allows a user to specify optimization giveaway tolerances to a system that in response automatically optimizes steady-state targets. Further, the controller module 424 may automatically calculate and implement a move plan (e.g., containing control moves and/or step moves) based on the steady-state targets.

Figure 5:
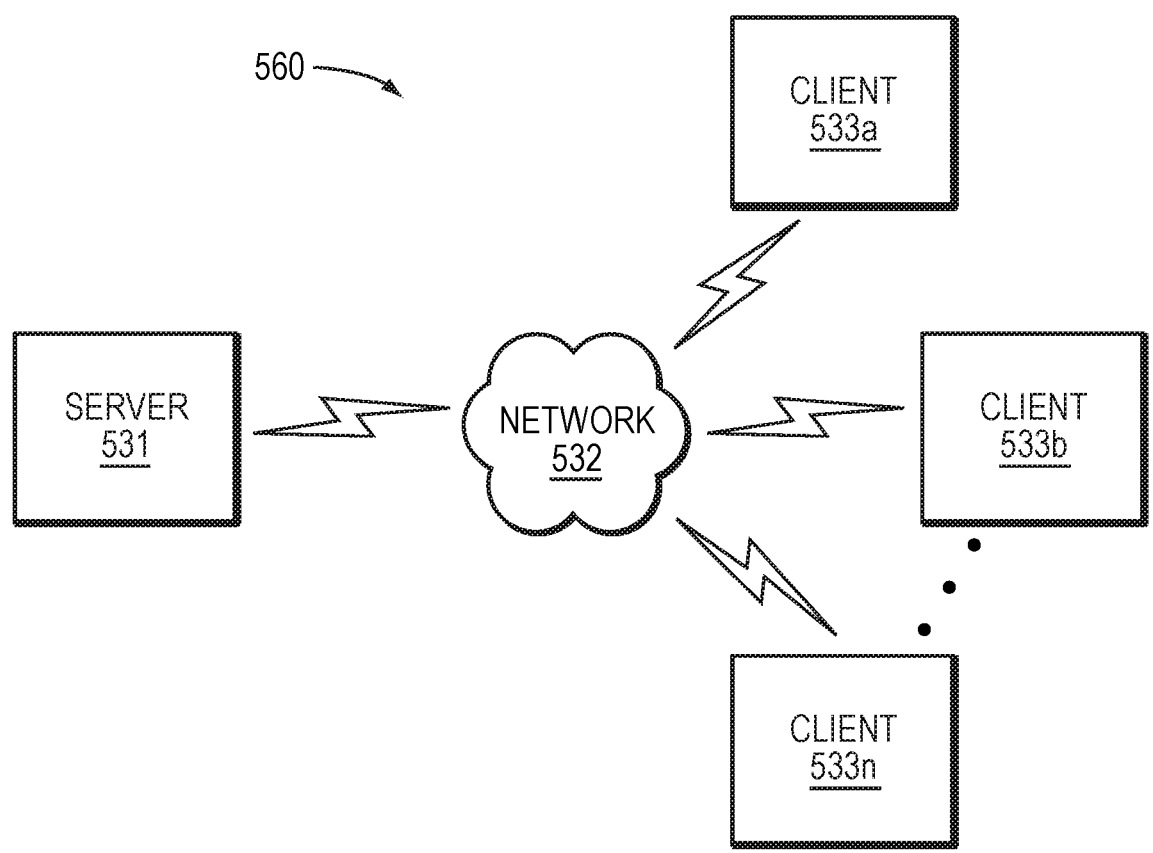
FIG. 5 is a schematic diagram of an example computer network environment in which embodiments of the invention may be implemented.

FIG. 5 illustrates a computer network environment 560 in which an embodiment of the present invention may be implemented. In the computer network environment 560, the server 531 is linked through the communications network 532 to the clients 533*a-n*. The environment 560 may be used to allow the clients 533*a-n*, alone or in combination with server 531, to execute any of the modules and/or methods described hereinabove (e.g., modules 105, 115, 201, 207, 215, 220, 225, 230, and 300 described hereinabove in relation to FIGS. 1A, 1B, 1C, 2B, and 3). It should be understood that the example embodiments described above may be implemented in many different ways. In some instances, the various methods and machines described herein may each be implemented by a physical, virtual, or hybrid general purpose computer, or a computer network environment such as the computer environment 560.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method of increasing performance in conducting step testing of an industrial process, the method comprising:

configuring a MPC controller that controls an industrial process at a plant or refinery, the MPC controller having an objective function and the industrial process having one or more process variables;

for each of the one or more process variables:
receiving a giveaway tolerance defining an allowable difference between a current value of the process variable and a target value for the process variable, the target value determined by the MPC controller;

determining that at least one of the process variables does not meet the received giveaway tolerance and adjusting the configuration of the MPC controller in a manner that moves the at least one process variables not meeting the received giveaway tolerance towards the received giveaway tolerance, wherein the adjusting creates room for the at least one process variables not meeting the received giveaway tolerance to optimize by modifying high and low limits on at least one process variable already within the respective received giveaway tolerance, the adjusting comprising, for each of the one or more process variables:

calculating an optimal target value for the process variable using the objective function;

in response to the current value not being within the giveaway tolerance with respect to the calculated optimal target value, determining to optimize the process variable;

in response to determining not to optimize the process variable:
adjusting the configuration with respect to the process variable by modifying at least one of high and low limits on the process variable; and
adjusting the objective function by removing the process variable from the calculation performed by the objective function;

using the adjusted configuration, calculating new target values for the one or more process variables;

generating a dynamic move plan from the calculated new target values; and adding to the dynamic move plan perturbation signals calculated based on the adjusted configuration.

2. The method of claim 1 further comprising:
using both the adjusted objective function and the adjusted configuration, in calculating the new target values.

3. The method of claim 1, wherein the objective function is constructed for economic optimization based on minimum cost.

4. The method of claim 1, wherein:
the objective function includes a cost factor for a given process variable with a current value within the giveaway tolerance with respect to the calculated optimal target value, and
the removing of the given process variable comprises setting the cost factor to zero.

5. The method of claim 1, wherein:
the high and low limits on the at least one process variable already within the respective giveaway tolerance are modified such that calculation of the current value complies with the giveaway tolerance.

6. The method of claim 1, further comprising:
if at least one process variable is outside the giveaway tolerance, re-running the optimization with the adjusted objective function and the adjusted configuration, the re-running forces the current value of the at least one process variable outside the giveaway tolerance to move within or close to the giveaway tolerance, while relaxing optimization on the current value of process variables inside the giveaway tolerance.

7. The method of claim 1, wherein the one or more process variables include at least one of: manipulated variables (MV) and controlled variables (CV).

8. The method of claim 1, wherein adding the perturbation signals further comprising:
calculating the perturbation signals by maximizing step size with respect to: (a) constraints on the one or more process variables and (b) the adjusted configuration; and
using the calculated perturbation signals, performing closed-loop step testing of the industrial process.

9. The method of claim 1, wherein generating the dynamic move plan further comprises:
calculating control signals based on the adjusted configuration; and
using the calculated control signals, adjusting behavior of the industrial process.

10. A computer system for increasing performance in conducting step testing of an industrial process, the system comprising:
a user interface configured to enable a user to define a giveaway tolerance for each of one or more process variables;
a MPC controller configured to control an industrial process at a plant or refinery, the MPC controller having an objective function and the industrial process having one or more process variables, the MPC controller implementing:
a target optimizer, for each of the one or more process variables, the target optimizer configured to:
(i) receive, from the user interface, a defined giveaway tolerance for the process variable, the defined giveaway tolerance defining an allowable difference between a current value of the process variable and a target value for the process variable, the target value determined by the target optimizer, and
(ii) determine if the current value of the process variable meets the received giveaway tolerance;
the target optimizer further configured to:
in response to at least one of the process variables not meeting the received giveaway tolerance, adjust the configuration of the MPC controller in a manner that moves the at least one process variables not meeting the received giveaway tolerance towards the received giveaway tolerance, wherein the adjusting creates room for the at least one process variables not meeting the received giveaway tolerance to optimize by modifying high and low limits on at least one process variable already within the respective received giveaway tolerance, wherein the adjusting comprises, for each of the one or more process variables:
calculating an optimal target value for the process variable using the objective function;
determining to optimize the process variable if the current value is not within the giveaway tolerance with respect to the calculated optimal target value;
in response to determining not to optimize the process variable:
adjusting the configuration with respect to the process variable by modifying at least one of high and low limits on the process variable; and
adjusting the objective function by removing the process variable from the calculation performed by the objective function; and
using the adjusted configuration, calculate new target values for the one or more process variables; and
a dynamic controller configured to:
generate a dynamic move plan from the calculated new target values; and
add to the dynamic move plan perturbation signals calculated based on the adjusted configuration.

11. The computer system of claim 10, wherein the target optimizer is further configured to:
use both the adjusted objective function and the adjusted configuration, in calculating the new target values.

12. The computer system of claim 10, wherein the objective function is constructed for economic optimization based on minimum cost.

13. The computer system of claim 10, wherein:
the objective function includes a cost factor for a given process variable with a current value within the giveaway tolerance with respect to the calculated optimal target value, and
the target optimizer removes the given process variable by setting the cost factor to zero.

14. The computer system of claim 10, wherein:
the high and low limits on the at least one process variable already within the respective giveaway tolerance are modified such that calculation of the current value complies with the giveaway tolerance.

15. The computer system of claim 10, wherein the target optimizer is further configured to:
if at least one process variable is outside the giveaway tolerance, re-run the optimization with the adjusted objective function and the adjusted configuration, the re-running forces the current value of the process variable outside the giveaway tolerance to move within or close to the giveaway tolerance, while relaxing optimization on the current value of process variables inside the giveaway tolerance.

16. The computer system of claim 10, wherein the one or more process variables are manipulated variables (MVs).

17. The computer system of claim 10, wherein the dynamic controller is further configured to add the perturbation signals by:

calculating the perturbation signals by maximizing step size with respect to: (a) constraints on the one or more process variables and (b) the adjusted configuration; and using the calculated perturbation signals, performing closed-loop step testing of the industrial process.

18. A non-transitory computer-readable storage medium having computer-readable code stored thereon, which, when loaded and executed by a computer processor, causes the computer processor to increase performance in conducting step testing of an industrial process by:

configuring a MPC controller that controls an industrial process at a plant or refinery, the MPC controller having an objective function and the industrial process having one or more process variables;

for each of the one or more process variables:
receiving a giveaway tolerance defining an allowable difference between a current value of the process variable and a target value for the process variable, the target value determined by the MPC controller;

determining that at least one of the process variables does not meet the received giveaway tolerance and adjusting the configuration of the MPC controller in a manner that moves the at least one process variables not meeting the received giveaway tolerance towards the received giveaway tolerance, wherein the adjusting creates room for the at least one process variables not meeting the received giveaway tolerance to optimize by modifying high and low limits on at least one process variable already within the respective received giveaway tolerance, the adjusting comprising, for each of the one or more process variables:

calculating an optimal target value for the process variable using the objective function;

in response to the current value not being within the giveaway tolerance with respect to the calculated optimal target values, determining to optimize the process variable;

in response to determining not to optimize the process variable:
adjusting the configuration with respect to the process variable by modifying at least one of high and low limits on the process variable; and
adjusting the objective function by removing the process variable from the calculation performed by the objective function;

using the adjusted configuration, calculating new target values for the one or more process variables;

generating a dynamic move plan from the calculated new target values; and adding to the dynamic move plan perturbation signals calculated based on the adjusted configuration.

* * * * *